Aug. 26, 1924. 1,506,721
J. JAVORSKY
METHOD OF PRODUCING SPRAY NOZZLES
Filed Oct. 6, 1919
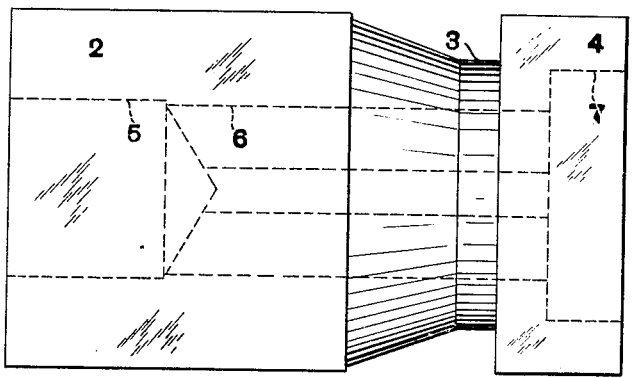
Fig. 1
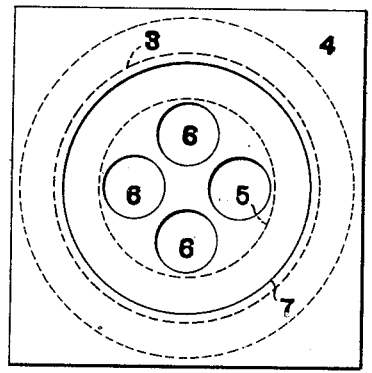
Fig. 2
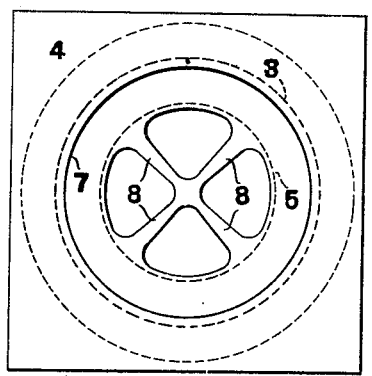
Fig. 3
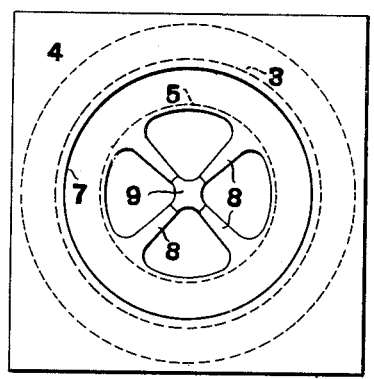
Fig. 4
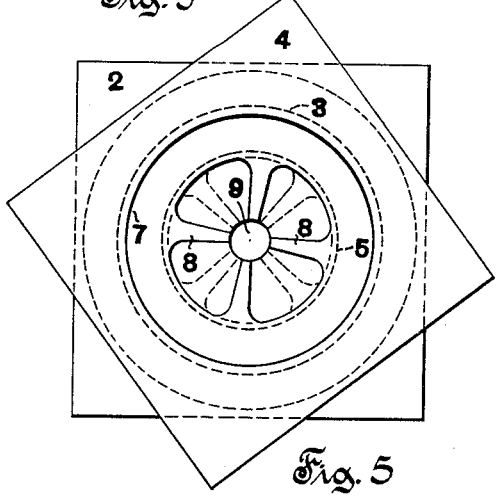
Fig. 5
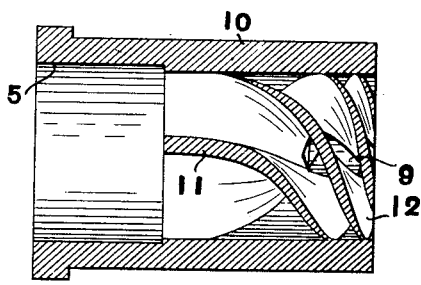
Fig. 8
Fig. 9
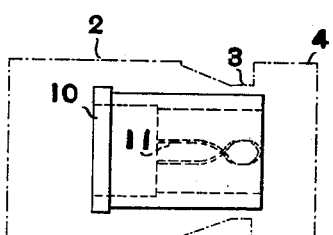
Fig. 6
Fig. 7
Inventor
J. Javorsky
by
Attorney Patented Aug. 26, 1924.

1,506,721

UNITED STATES PATENT OFFICE.

JOSEPH JAVORSKY, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

METHOD OF PRODUCING SPRAY NOZZLES.

Application filed October 6, 1919. Serial No. 329,405.

*To all whom it may concern:*

Be it known that JOSEPH JAVORSKY, a citizen of Czechoslovakia, residing at West Allis, in the county of Milwaukee and State of Wisconsin, has invented a certain new and useful Improvement in Method of Producing Spray Nozzles, of which the following is a specification.

This invention relates in general to improvements in the construction of nozzles for spraying liquids, and especially to an improved method of producing or constructing such nozzles.

An object of the invention is to provide a simple and efficient method of producing a compact nozzle structure which is capable of efficiently producing a homogeneous spray of atomized liquid.

It has been found that a homogeneous spray of atomized liquid, may readily be produced by causing the liquid to swirl and by subsequently delivering the swirling liquid through a constricted orifice. Swirling motion of the liquid is ordinarily effected by forcing a stream of the liquid through a passage having one or more helical vanes therein. By permitting the swirling liquid to escape into free space through a constricted orifice located adjacent the discharge ends of the swirl producing vanes, a frusto-conical spray of atomized liquid of relatively uniform homogeneity results. Such a spray of liquid is desirable for various purposes, such as for cooling liquids, for delivery of liquid fuel in atomized form to internal combustion engines, for delivery of coating pigments to surfaces, and for many other purposes.

It is a relatively simple matter to construct spray nozzles provided with helical vanes for swirling liquid preparatory to atomization thereof, when such nozzles are of sufficient size to permit casting or other ready formation of the vanes. Considerable difficulty is however encountered when it is attempted to cast or otherwise form relatively small nozzle elements having helical vanes therein the thickness of which is less than ⅛ of an inch. In places where high temperatures are encountered, as for instance in internal combustion engines, it is desirable to have the nozzle structure capable of withstanding relatively high temperatures, thus making it desirable to have the nozzles constructed of steel or the like. Due to the helical formation of the vanes of these nozzle elements it has heretofore been impossible to form the same by other processes than casting. The difficulties of producing steel castings of limited thicknesses are well known to those skilled in the art and the process of casting these small nozzle elements has proven unsuccessful as the cast vanes were generally imperfect.

The present invention besides relating to an improved construction of nozzle, relates to a process whereby nozzles having helical internal vanes may be readily constructed by mechanical methods and perfect vane structures produced regardless of their relative frailty.

A clear conception of one form of nozzle forming the subject of the present invention as well as one process of producing such nozzles may be had by referring to the drawing accompanying and forming a part of this specification in which like reference characters designate the same or similar parts in the various views.

Fig. 1 represents an enlarged elevation of a partially machined block of metal such as is employed in constructing a nozzle.

Fig. 2 is a similar enlarged end view of the partially machined block of metal.

Fig. 3 is a similar enlarged end view of the block of metal showing straight vanes formed in the central through passage thereof.

Fig. 4 is a similar enlarged end view of the block of metal showing straight vanes formed in the central through passage thereof and showing these vanes cut away at their forward inner edges.

Fig. 5 is a similar enlarged end view of the block of metal showing the forward portion thereof twisted relatively to the rear portion thereof through an angle of 215°.

Fig. 6 is a side elevation, actual size, of a nozzle element constructed in accordance with the present invention showing the same cut from the original block of metal which is shown in dot and dash lines.

Fig. 7 is an end view, actual size, of a complete nozzle element.

Fig. 8 is an enlarged transverse sectional view through a completed nozzle element the section through the outer casing being taken along a central vertical plane, and through the vanes being taken along the outer edges thereof at the periphery of the through passage.

Fig. 9 is a transverse vertical section through a completed nozzle of reduced size, showing the relative position of the vaned element and the remainder of the nozzle structure.

The present invention relates particularly to the construction and formation of the portion of a spray nozzle in which the liquid is given a swirling motion. As previously stated, such swirling motion is imparted to the liquid by means of a plurality of vanes 11 which may either be formed directly within the main nozzle casing or in a secondary casing which with the nozzle assembled is located within the main nozzle casing. As shown in the drawing and particularly in Fig. 8, the nozzle element when completed, consists of a cylindrical outer casing 10 having a through passage formed as a cylindrical bore through the center thereof. In the forward portion of this through passage is located a series of four vanes 11, the rear portion 5 being a cylindrical unobstructed bore. The rear portions of the vanes 11 are substantially parallel to the central axis of the through passage of the element. The forward portions 12 of the vanes 11 are of helical formation, the helices being of gradually decreasing pitch as they approach the nozzle discharge. The rear parallel portions of the vanes 11 meet at the axial center of the element while the forward helical portions 12 of the vanes are spaced apart by virtue of the formation of the hole 9 at the inner forward edges of the vanes. The casing 10 is formed for insertion within a main nozzle casing 13 of usual construction, and is held within this main casing 13 in any suitable manner. The main casing 13 is provided with a mixing chamber 14 and a constricted discharge orifice 15 located at the delivery ends of the swirl producing vanes 11.

The process of forming the nozzle element shown in its completed form in Fig. 8, is as follows:

A rectangular prismatic block of metal such as mild steel, is first machined to the form shown in Fig. 1 with two rectangular prismatic portions 2, 4 separated by a tapered circular portion 3 of reduced cross sectional area. The rear end portion 2 of the metallic block is provided with an unobstructed bore 5, while the forward portion 4 of the block is provided with an unobstructed bore 7. The bores 5, 7 are connected by means of four drilled holes spaced equi-distant apart and symmetrically arranged about the axis of the block, these holes forming through passages within the block. After the holes 6 have been formed the walls thereof are broached or otherwise dressed to form substantially triangular passages which are separated by four radiating centrally-united straight vanes 8 as shown in Fig. 3. When the straight vanes 8 have been thus formed the forward inner ends thereof are spaced apart by drilling a hole 9 at the intersection of the vanes. With the block thus formed, the neck portion 3 is heated so as to permit twisting of the block at the locally reduced portion 3. The block is then clutched at the portions 2, 4 and is twisted at the reduced portion 3 through an angle of approximately 215°, this angle depending upon the pitch of vane desired. During this twisting of the block, the vanes 8 are distorted to give them helical shapes. Due to the tapered formation of the portion 3 of the block the forward ends of the vanes will be twisted to a greater extent than the rear portions thereof, thus producing vanes which at their rear portions are substantially parallel to the axis of the block and which at their forward portions 12 are of helical formation with gradually decreasing pitch. After the block has been thus twisted, the excess metal is cut away leaving the completed nozzle element shown in Figs. 6, 7 and 8. It may be necessary to somewhat dress the inner surface of the bore 5 of the element after the twisting operation has been performed, but the vanes are finished in their entirety by the twisting operation and cannot be dressed to any substantial extent after they have been once twisted.

It has been found that this process of forming the swirl producing vanes 11 is exceedingly efficient and is relatively simple. The vanes can be properly formed regardless of their thickness and of the minute size of the nozzle. The formation of the hole 9 adjacent the ends of the vanes permits these vanes to be twisted more readily than if the vanes remain connected at their inner forward portions.

During the operation of the nozzle the liquid under pressure is admitted to the rear portion of the nozzle and is forced past the helical vanes 11. In passing the vanes 11 the liquid is given a swirling motion, the swirling mass of liquid being delivered from the end portions 12 of the vanes into the mixing chamber 14. In the mixing chamber 14 the rapidly swirling mass of liquid is thoroughly mixed and its velocity increased as it approaches the orifice 15. Upon being delivered from the orifice 15 the liquid mass is suddenly expanded and forms a homogeneous spray of atomized liquid of frusto-conical shape. It will be noted that as the liquid passes through the spaces between the vanes 11 its velocity is increased at the same time that it is given the swirling motion. This increase in velocity results from the decreasing pitch of the helical vanes and assists the walls of the mixing chamber 14 in producing maximum velocity of the liquid before being ejected from the nozzle.

It should be understood that it is not desired to limit the invention to the exact details of construction herein shown or to the exact steps of the process herein described, for various modifications may occur to persons skilled in the art.

It is claimed and desired to secure by Letters Patent:

1. The method of producing spray nozzle elements, which comprises, forming a casing with a conduit and a vane extending inwardly toward the axis of said conduit, and twisting said casing to distort said vane.

2. The method of producing spray nozzle elements, which comprises, forming a casing with a conduit and a plurality of centrally united vanes within said conduit, and twisting said casing to distort said vanes.

3. The method of producing spray nozzle elements, which comprises, forming a casing with a conduit and with a plurality of centrally united vanes within said conduit, heating said casing, and twisting said casing to distort said vanes.

4. The method of producing spray nozzle elements, which comprises, forming a casing with a conduit having a plurality of centrally united vanes therein and having a casing portion of reduced cross sectional area adjacent to one portion of said vanes, heating said casing adjacent to the portion of reduced cross sectional area, and twisting said casing adjacent to the heated portion to distort said vanes.

5. The method of producing spray nozzle elements, which comprises, forming a casing with a conduit and with a plurality of centrally united vanes within said conduit, heating said casing, twisting said casing to distort said vanes, and removing the direct union between said vanes at the center of said conduit.

In testimony whereof, the signature of the inventor is affixed hereto.

JOSEPH JAVORSKY.